United States Patent [19]

Doffe

[11] 3,995,449
[45] Dec. 7, 1976

[54] JOINT FOR THE HOMOKYNETIC TRANSMISSION OF ROTARY MOTION BETWEEN TWO CONCURRENT SHAFTS

[76] Inventor: Rene Louis Doffe, 8, Allee des Aulnes Parc de l'Aulnay, 77360 Vaires S. Marne, France

[22] Filed: June 10, 1975

[21] Appl. No.: 585,711

[30] Foreign Application Priority Data

June 13, 1974 France .............................. 74.20613

[52] U.S. Cl. ...................................... 64/20; 64/19; 64/23.7
[51] Int. Cl.² ........................................... F16D 3/28
[58] Field of Search ................. 64/20, 19, 12, 23.7

[56] References Cited
UNITED STATES PATENTS

| | | | |
|---|---|---|---|
| 1,334,388 | 3/1920 | Massé | 64/20 |
| 1,896,133 | 2/1933 | Chilton | 64/20 |
| 3,285,080 | 11/1966 | Klavir | 64/19 |
| 3,907,384 | 9/1975 | McCloskey | 64/23.7 |

FOREIGN PATENTS OR APPLICATIONS 214,968   3/1968   U.S.S.R. ................. 64/20

*Primary Examiner*—Samuel Scott
*Assistant Examiner*—Randall Heald

[57] ABSTRACT

A joint for homokynetic transmission of rotary motion between two concurrent shafts of which head portions are mounted. The head portions are connected by pairs of articulated driving-rods each slidably and rotatably disposed in a respective bore in a respective head portion. All the pairs of rods ensure the rotary transmission, and both head portions are also hinge-coupled with double articulation line by means of coupling-boxes loosely mounted on the head portions.

7 Claims, 14 Drawing Figures

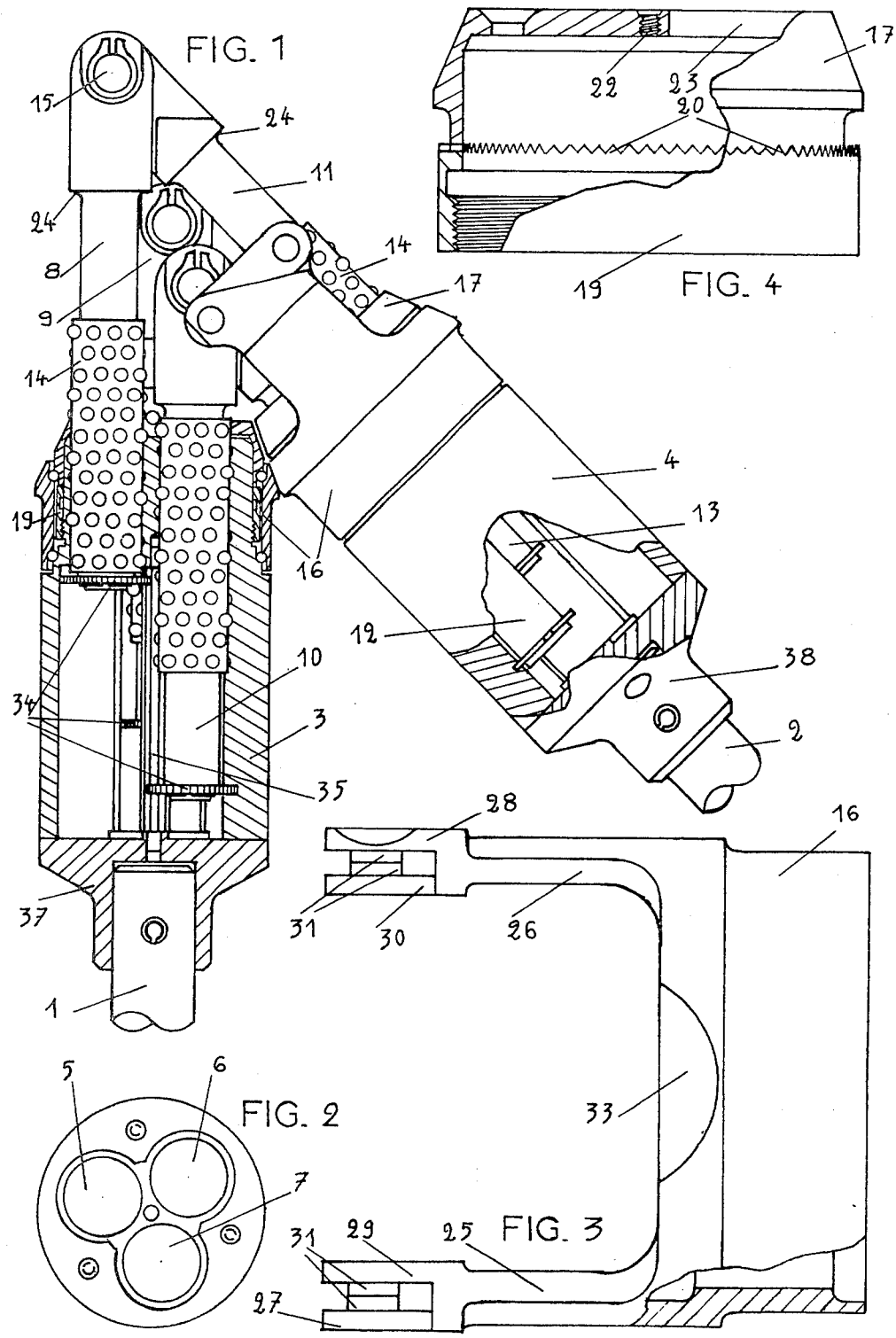

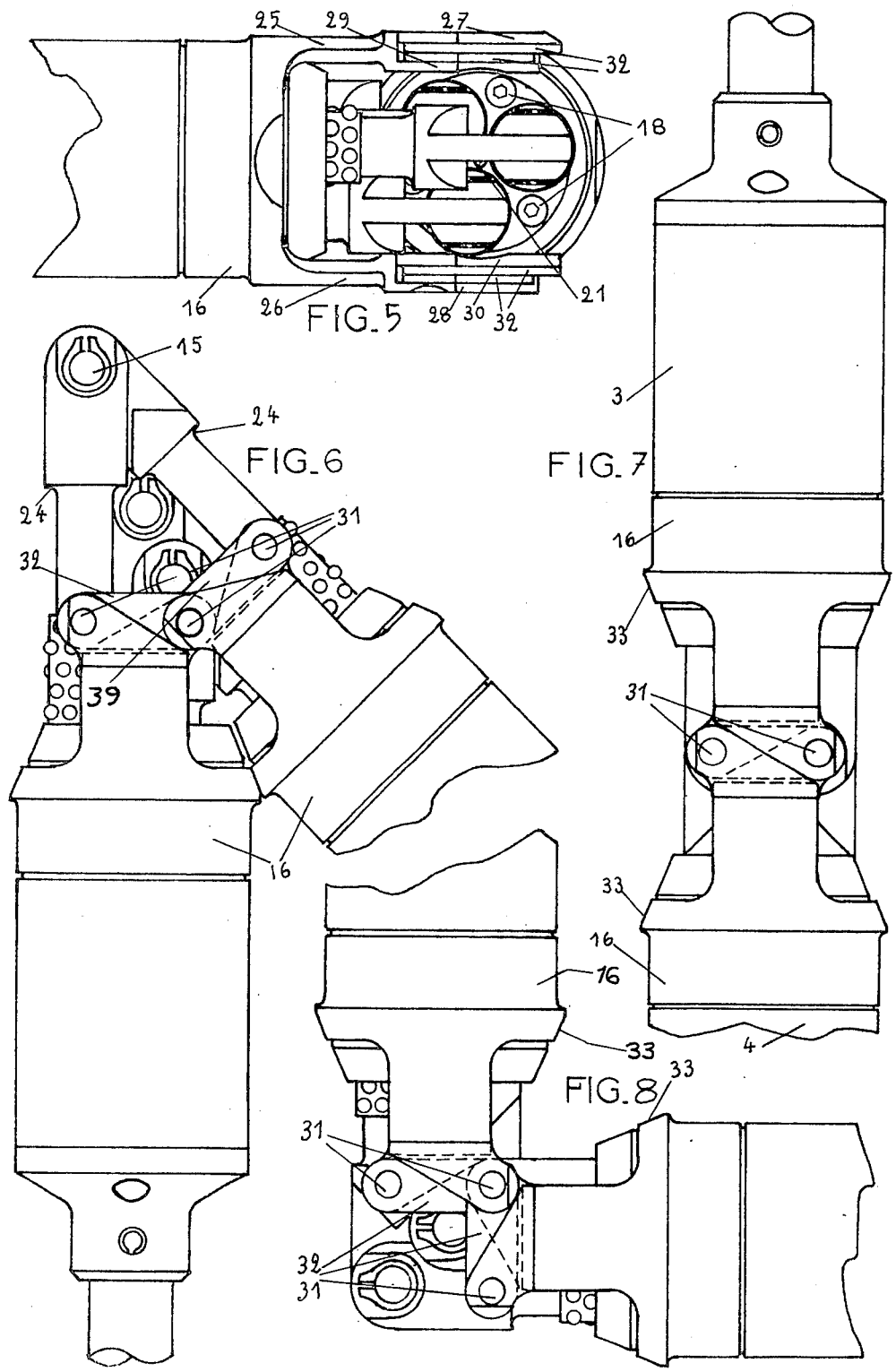

JOINT FOR THE HOMOKYNETIC TRANSMISSION OF ROTARY MOTION BETWEEN TWO CONCURRENT SHAFTS

The invention relates to a mechanism for the homokinetic transmission of rotary motion between two concurrent shafts.

The known contrivances allowing the transmission of the rotary motion between two concurrent shafts cannot work correctly when the angle formed by the shafts is less than 130°.

On the other hand, with the Cardan articulation system, or universal joint, the angular velocity cannot be maintained. The amplitude of the periodic variations of the ratio of the angular velocity is so much the more important that the angle formed by the two shafts is smaller. It is necessary to connect two articulations of this type (Hookes joint) to prevent this disadvantage. In the contrivances using balls or rollers the angle formed by the two shafts cannot be, in the best case, less than about 130°.

An object of the invention is to provide a joint in which the aforesaid disadvantages are avoided or at least mitigated.

According to the invention there is provided a mechanism for the transmission of rotary motion from one shaft to another concurrent shaft, comprising head portions mounted on the shafts, said head portions being formed with bores receiving driving rods which can slide and rotate in the bores, each rod on one head portion being connected to a respective said rod on the other head portion whereby the connected rods form pairs, each pair comprises a female rod with a strap-shaped extremity and a male rod with a tenon-shaped extremity fitted into said strap-shaped extremity, both rods of each pair being connected by an articulation axis whereby the two head portions can form an acute angle, each head portion being provided at the end opposite to the corresponding shaft, and externally to the pairs of rods with a coupling-box loosely mounted on an axle, the coupling-boxes being hinge-coupled by means of axes connected together by swinging-rods and disposed on two lines, the distance between centres of these two lines being equal to a diameter of a circle having a circumference on which the bores in a respective head portion are located, and both lines being tangential to an end of a common diameter.

With the mechanism formed according to the invention, the angular velocity of the transmitted rotary motion can be maintained, and the angle formed by the two shafts can change, even during their rotation, between an upper limit of 180° (shafts in a straight line) and a lower limit of 45°.

An example of the mechanism formed in accordance with the invention will now be described with reference to the accompanying drawings. In the drawings:

FIG. 1 is a side view of the whole mechanism formed according to the invention, shown partially in section;

FIG. 2 is an end view of one of the head portions without a cap, showing the disposition of bores;

FIG. 3 is an enlarged view of one of the coupling boxes;

FIG. 4 is an enlarged view of a cone mounted on a corresponding theaded ring used in the mechanism in FIG. 1;

FIG. 5 is a fragmentary plan view of the mechanism in FIG. 1 when the angle between the shafts is equal to 90°;

FIG. 6 is a fragmentary side view of the mechanism in FIG. 1 when the angle between the shafts is a minimum;

FIG. 7 is a fragmentary side view of the mechanism in FIG. 1 when the shafts are aligned;

FIG. 8 is a framentary side view of the mechanism in the attitude in FIG. 5;

Figure 9:
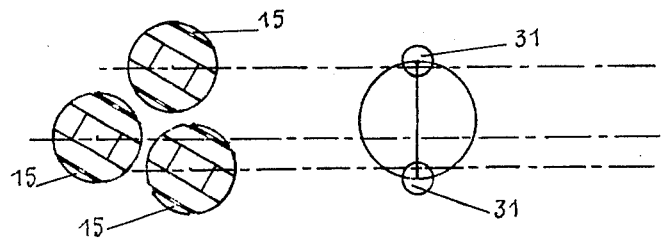
FIG. 9 is a diagrammatic illustration of the mechanism when the shafts are at 180°.

Referring now to the drawings, the mechanism is composed of two similar contrivances each having a head portion 3 or 4 (FIG. 1) each formed with three bores 5, 6, 7 (FIG. 2), equally distant from the geometrical axis of the respective head portion and, two by two, equally distant one from each around the circumference of the circle on which the bores are disposed. Each head portion is completed, at one end, with a cap 37 or 38 (FIG. 1). Each cap defines a cavity in which one of the shafts 1 or 2 is pinned.

Inside each bore 5, 6, 7 (FIG. 2) is placed a driving rod 8 to 13 (FIG. 1), which slides and rotates within an interposed ball-cage 14. The three driving rods 8, 9, 10 in the bores of the head portion 3 have a strap-shaped extremity. Each of the three driving rods 11, 12, 13 in the bores of the head portion 4 has an extremity pivotably mounted in the strap of one of the rods 8, 9, 10 by means of an axis of articulation 15.

A coupling box 16 (FIGS. 1 and 3) is mounted loose on axle on each head portion 3, 4. The extremity of each head portion 3, 4 has a shoulder on which an extremity of the corresponding coupling-box is fitted in conjunction with a ball-train. Each coupling-box is maintained in its own position by a cone 17 (FIGS. 1 and 4) and a second ball-train. Each cone is fixed on the corresponding head portion with three screws 18 (FIG. 5). The correct bearing of each coupling-box on the two corresponding ball-trains can be regulated by means of a threaded ring 19 (FIGS. 1 and 4) screwed on each head portion 3, 4 (FIG. 1). This ring has notches 20 (FIG. 4) wherein are fitted similar notches in the cone 17. This arrangement permits screwing or unscrewing of the ring 19 by turning the cone 17. When the optimum play is obtained, the cone has to be moved back and turned until the holes of the fixing screws 18 (FIG. 5) coincide with three corresponding threaded bores in the head portion. A set-screw 21 (FIG. 5) screwed in a central bore 22 (FIG. 4) of the cone 17 is used as fulcrum of the cone on the corresponding body. This permits correct locking of the screws 18 (FIG. 5) without straining the cone. In the end of each cone are three holes 23 (FIG. 4) coinciding with the bores 5, 6, 7 FIG. 2 of the corresponding head portion. The diameter of these holes is larger than the diameter of the driving-rods 8 to 13 (FIG. 1). Therefore the driving-rods can reach the inner part of the cone ends until shoulders 24 of the driving-rods come to contact with the front of the corresponding head portion 3 or 4.

Opposite to its extremity fixed on the head portion, each coupling-box 16 (FIGS. 3 and 5) is formed with two branches 25 and 26 with a strap-shaped extremity. Both straps of each coupling-box have symmetrical shapes in relation with the geometrical axis of the coupling-box. Both coupling-boxes are similar. Each strap includes an external cramp 27 for the branch 25, and 28 for the branch 26, and an internal cramp 29 for the branch 25, and 30 for the branch 26. Each cramp is provided with a skewed-edge (FIGS. 6, 7 and 8) which ends as an ear. The skewed edges are in juxtaposition two by two when the mechanism is in a striaght line (FIG. 7). The ears of the cramps 27 to 30 (FIGS. 3 and 5) are provided with axes 31 (FIG. 3). An extremity of each of these axes goes beyond the ear towards the inside of the strap. The axes 31 (FIGS. 6, 7 and 8) are connected two by two by four swinging-rods 32 (FIGS. 5, 6 and 8), which are disposed two by two in the width of each strap (FIG. 5). Each swinging rod 32 is articulated on an axis 31 of one of the coupling-box 16 on the one hand, and on an axis 31 of the other coupling-box (FIGS. 6, 7 and 8 on the other hand. This arrangement secures the connection of the two coupling-boxes and permits each coupling-box to pivot with respect to the other on both sides of the aligned position of the mechanism (FIG. 7), thereby composing a hinge with double articulation line.

Figure 10:
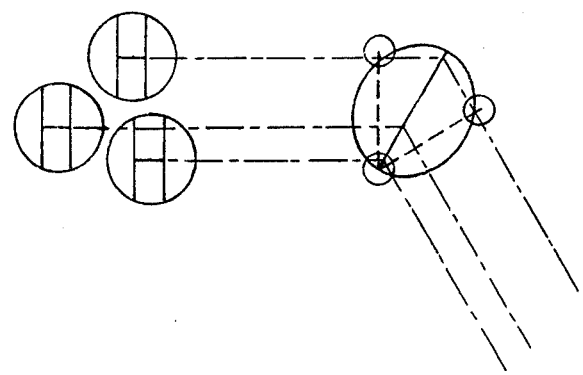
FIG. 10 is a diagrammatic illustration of the mechanism when the shafts are at 120°.
Figure 11:
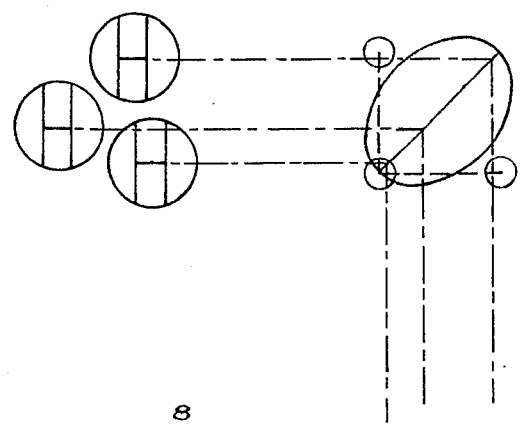
FIG. 11 is a diagrammatic illustration of the mechanism when the shafts are at 90°.
Figure 12:
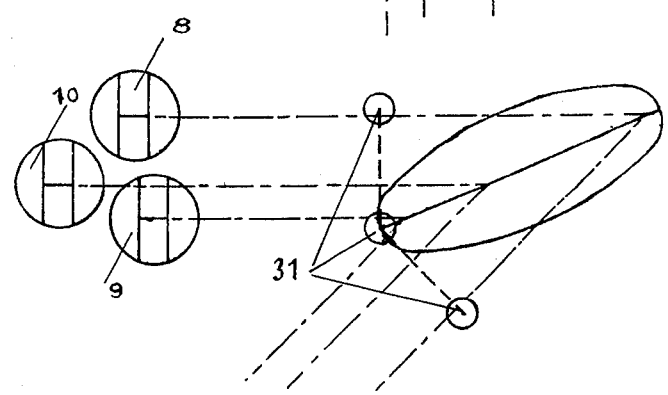
FIG. 12 is a diagrammatic illustration of the mechanism when the shafts are at 45°.

The distance between centres of each one of the swinging rods 32 (FIG. 6) is equal to the diameter of the circle on the circumference of which are disposed the bores 5, 6, 7 (FIG. 2). Thus, whatever the angle formed by the two parts of the mechanism, the shoulders 24 (FIG. 1) of the driving-rods passing inside off this angle are always equally distant from the front of the corresponding head portion 3, 4. This consequence comes from the fact that, when the mechanism is aligned (FIG. 7), the two articulation lines, on which the centres of axes 31 are located, are tangential to the circumference described by the centres of axes 15 (FIGS. 1 and 9); this circumference is identical to the circumference on which the bores 5, 6 and 7 (FIG. 2) are disposed. As soon as the angle formed by the two shafts 1 and 2 (FIG. 1) is different from a plane angle, the curve described by the centres of axes 15 becomes an ellipse (FIGS. 10, 11 and 12). There is a particular ellipse for each angle. Each ellipse is disposed in a plane which is perpendicular to the geometrical axis plane of the shafts 1 and 2 (FIG. 1). The plane in which the ellipse is disposed is orientated in accordance with the bisectrix of the angle formed by the shafts 1 and 2. There is a common point between all the ellipses described by the centres of axes 15 and the circumference described when the shafts are aligned. This point is located in the plane of the angle formed by the two shafts and inside the angle. On the other hand, the line connecting the centres of axes 31 (FIGS. 10, 11 and 12) of the working articulation goes through this point. The minor axis of every ellipse is equal to the diameter of circle on which the bores 5, 6 and 7 are disposed (FIG. 2). The length of the major axis of each ellipse is inversely proporitonal to the value of the angle between the two shafts, the distance between the Focii of each ellipse being equal to the value of the maximum longitudinal movement effected by the driving rods 8 to 13 (FIG. 1) from the corresponding head portion to enable the shafts to adopt that angle. It is the variation of the ellipse which requires longitudinal movement of the driving-rods, this movement being nil when the shafts are aligned.

The described articulation system enables, when one part of the mechanism is stationary, the other part to pivot in a plane perpendicular to axes 31 of the swinging rods 32 (FIGS. 6 and 8) in order that the geometrical axis of the two head portions 3 and 4 (FIG. 1) form an angle which can be reduced to 45°. Two flats 33 (FIGS. 3, 7 and 8) come into abutment when this angle is reached (FIGS. 1 and 6). The pivoting motion is carried out in every position that can be held by the coupling-box 16 since each of these is loose on its own body. On the other hand, the pivoting motion of one of the two coupling-boxes with respect to the other can be carried out in the articulation plane, on both sides of the position where the geometrical axis of the two parts of the mechanism are aligned (FIG. 7).

When the two parts of the mechanism are aligned (FIG. 7), the head portions 3 and 4 are maintained by the coupling-boxes 16 at such a distance from one to each other that each shoulder 24 (FIG. 6) comes into abutment against the face of the corresponding head portion. Therefore, both axes 15 are aligned in the same plane as that occupied by the axes 31 (FIG. 7). In order that the axes 15 remain parallel (FIG. 9) in this aligned configuration, gear wheels 34 (FIG. 1) are mounted on extremities of the driving-rods 8, 9 and 10. The gear wheels 34 mesh with a central pinion 35 loose on an axle. The length of this pinion is such that the meshing is assured for every value of the longitudinal movement which can be effected by the driving-rods 8, 9 and 10.

If the mechanism is used in an application where the shafts 1 and 2 never become aligned, the gear wheels 34 and 35 are of no use. When the shafts 1 and 2 are aligned and rotating, the whole mechanism turns in one piece. But, if an angle differenct from the plane one is setting between the two shafts, then axes 15 automatically remain in a position which is perpendicular with respect to the angle plane, and the coupling-boxes 16 come to a standstill in such a position that their axes 31 (FIGS. 3, 6, 7 and 8) are parallel to the axes 15. At the same time there is a rotation and longitudinal movement of the driving rods 8 to 13 (FIG. 1) with respect to the bores 5, 6 and 7 (FIG. 2) of the head portions 3 and 4 (FIG. 1). The rotation is equal to one cycle revolution and the longitudinal movement is inversely proportional to the value of the angle between the shafts 1 and 2. This longitudinal movement is subject to an exponential law, which reduces the mechanism efficiency according to the reduction of the value of the angle and indicates that the length of the driving rods 8 to 13 must be in relation to the minimum working angle which is to be utilized.

Figure 13:
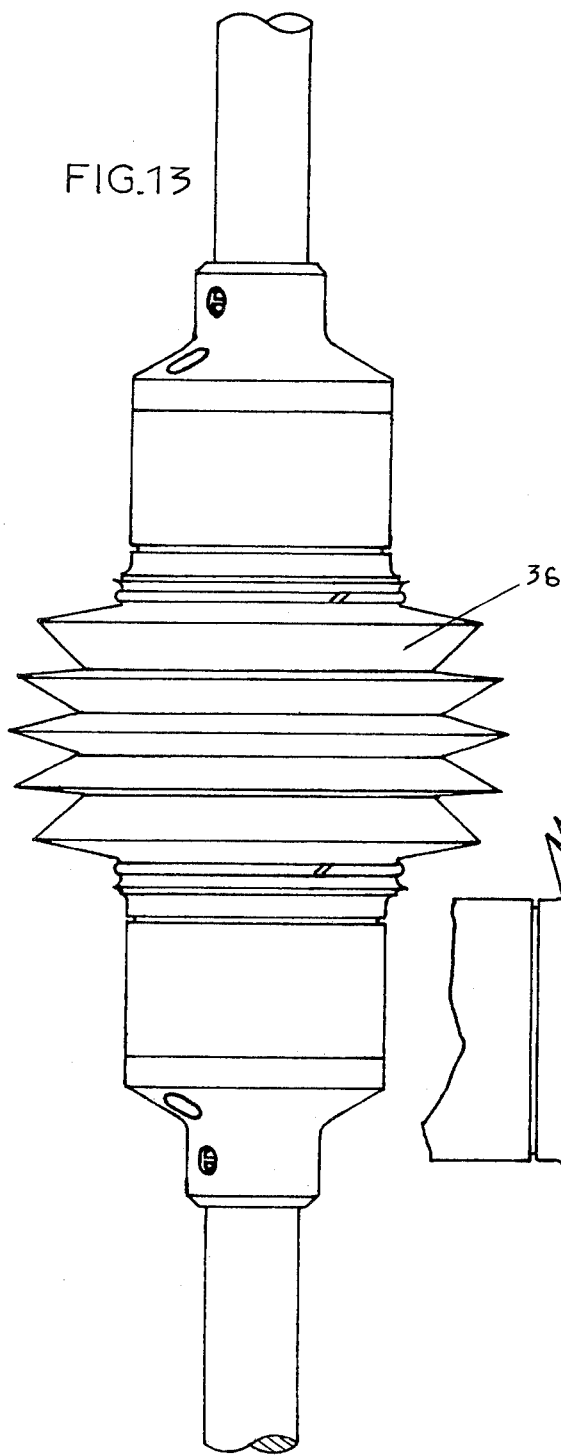
FIG. 13 is a side view of an alternative embodiment of the mechanism in FIG. 1, this alternative is provided with protective-bellows and has a minimum angle of 90° between the shafts.
Figure 14:
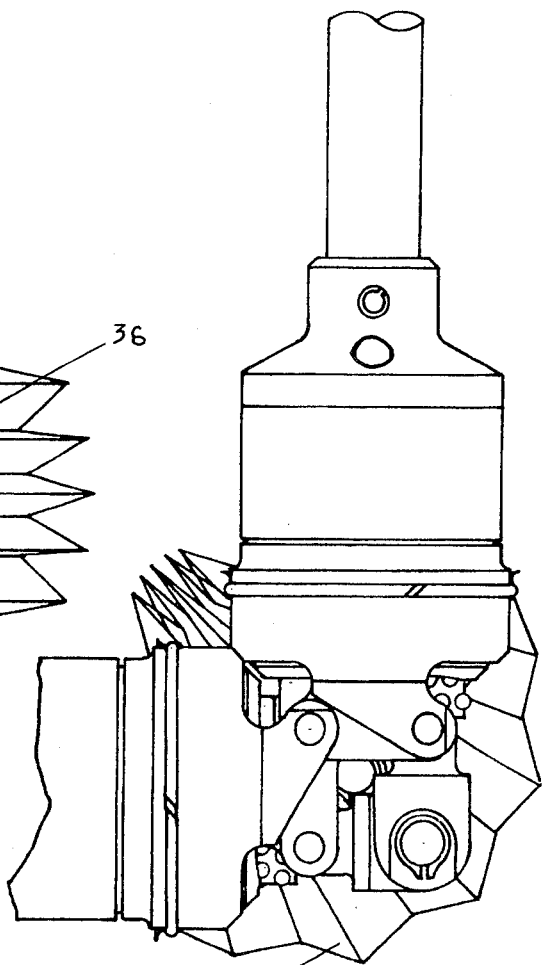
FIG. 14 is a side view of the mechanism in FIG. 13 when the angle between the shafts is a minimum.

Considering the occupied space and the efficiency, the smallest angle formed by the shafts, in the above described example, is limited to 45°. An embodiment in which the angle is limited to 90° is shown in FIGS. 13 and 14. Accordingly, the length of this mechanism is reduced to a little less than the ⅔ of the length of the mechanism in FIG. 1.

Since the coupling-boxes (FIG. 1) come to a standstill as soon as the shafts are no longer aligned, if the central part of the mechanism is fitted with protecting-bellows 36 (FIGS. 13 and 14), it is possible to fix on both coupling-boxes the extremities of the bellows which are consequently subjected only to the deflection due to the modification of the angle formed by the shaft and undergoes no furhter torsional strain because of the shafts rotation.

The mechanism formed in accordance with the invention can be utilized for the front wheel drive vehicles, miscellaneous machine tools, telemanipulators, etc.

What is claimed is:

1. A mechanims for the transmission of rotary motion from one shaft to another concurrent shaft comprising head portions mounted on the shafts, said head portions being formed with bores receiving driving-rods which can slide and rotate in the bores, each rod on one head portion being connected to a respective said rod on the other head portion whereby the connected rods form pairs, each pair comprises a female rod with a strap-shaped extremity and a male rod with a tenon-shaped extremity fitted into said strap-shaped extremity, both rods of each pair being connected by an articulation axis whereby the two head portions can form an acute angle, one of the head portions comprising a central pinion meshing with a gear wheel mounted on each driving-rod whereby the articulation axes of the pairs of driving-rods remain parallel when the shafts are aligned, each head portion being provided at the end opposite to the corresponding shaft, and externally to the pair of rods, with a coupling-box loosely mounted on an axle, the coupling-boxes being hinge-coupled by means of axes connected together by swinging-rods and disposed on two lines, the distance between centres of these two lines being equal to a diameter of a circle kaving a circumference on which the bores in a respective head portion are located, and both lines being tangential to an end of a common diameter.

2. A mechanism according to claim 1, in which a ball-cage is interposed between each driving-rod and the bore in which the rod is disposed.

3. In a mechanism for the transmission of rotary motion from one shaft to another concurrent shaft, comprising head portions mounted on the shafts, said head portions being formed with bores, having their axes on the same cylinder surface, coaxial to the shafts when the shafts are in alignment, the bores slidably and rotatably receiving driving-rods, with each rod on one head portion being pivotally connected to a respective rod on the other head portion whereby the connected rods form pairs for transmitting a rotary motion, each head portion being provided at the end opposite to the corresponding shaft, with a coupling box loosely mounted on an axle, and the coupling-boxes being hinge-coupled to each other, the improvement of said hinge-coupling being arranged in a two-fixed-axis hinge coupling, with the two axes being operative for hinging on one side and on the other side with respect to alignment of the shafts, respectively, and being tangential to both ends of a common diameter on a cross-section of said cylinder surface when said shafts are in alignment, respectively.

4. In a mechanism according to claim 3, in which a ball-cage is interposed between each driving-rod and the bore in which the rod is disposed.

5. In a mechanism for the transmission of rotary motion from one shaft to another concurrent shaft, comprising head portions mounted on the shafts, said head portions being formed with bores, the bores slidably and rotatably receiving driving-rods, with each rod on one head portion being pivotally connected to a respective rod on the other head portion whereby the connected rods form pairs for transmitting rotary motion, each head portion being provided at the end opposite to the corresponding shaft, with a coupling box loosely mounted on an axle, and the coupling-boxes being hinge-coupled to each other by means of two pairs of links extending on opposed sides with respect to said pairs of rods, with each of the links in said pairs having two articulation points on the two coupling-boxes, respectively, the improvement that the distance between the two articulation points on each link is equal to the distance of the two articulation points of each pair of links on each coupling-box.

6. In a mechanism for the transmission of rotary motion from one shaft to another concurrent shaft comprising head portions mounted on the shafts, said head portions being formed with bores receiving driving-rods which can slide and rotate in the bores, each rod on one head portion being pivotally connected to a respective rod on the other head portion whereby the connected rods form pairs for transmitting said rotary motion, the improvement that each pair comprises a female rod with a strap-shaped extremity and a male rod with a tenon-shaped extremity fitted into said strap-shaped extremity, and that one of the head portions comprises a central pinion meshing with a gear wheel mounted on each driving rod thereof whereby the articulation axes of the pairs of driving-rods remain parallel when the shafts are aligned.

7. In a mechanism according to claim 6, in which a ball-cage is interposed between each driving-rod and the bore in which the rod is disposed.

* * * * *